United States Patent Office 2,970,587
Patented Feb. 7, 1961

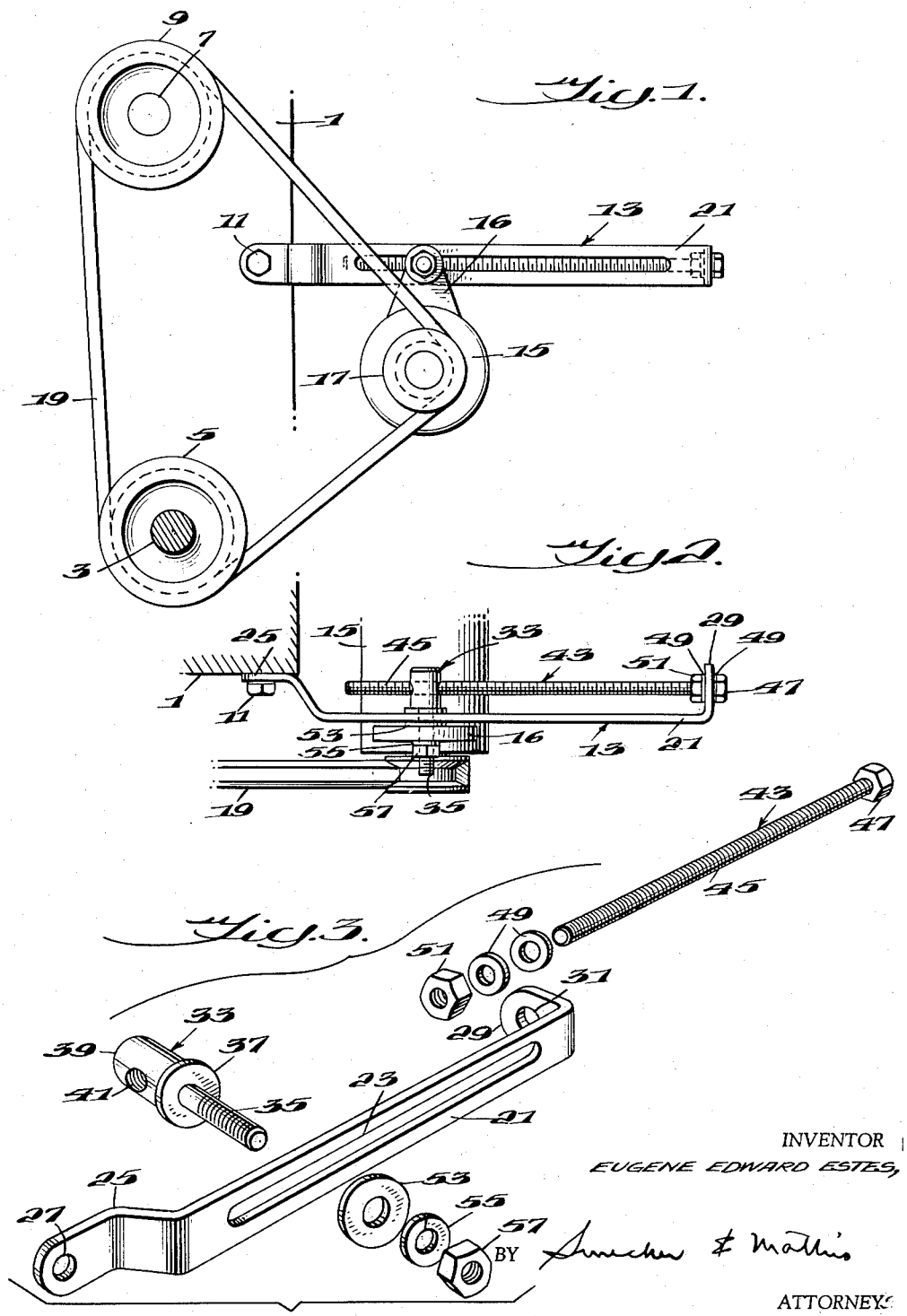

2,970,587
ADJUSTING MECHANISM
Eugene Edward Estes, Rte. 2, Brentwood, Tenn.
Filed July 21, 1958, Ser. No. 749,817
4 Claims. (Cl. 123—195)

This invention relates to an adjusting mechanism, and more particularly to an adjusting mechanism for taking up the slack in automotive belts commonly used to drive water pumps, fans and generators.

It is a common practice in an automotive vehicle to utilize the driven crank shaft as a means for driving the water pump with its associated fan and the electrical generating system of the vehicle. This is accomplished by placing coplanar pulley members on the shafts of the water pump, generator and engine, respectively. A belt, commonly known as a "fan belt," passes over these three pulleys and the motive force from the crank shaft pulley serves to drive the water pump and generator pulleys.

It frequently becomes necessary to adjust the tension of the fan belt, which becomes loosened because of wear and causes slippage. Since the crank shaft and water pump generally are found to be integral with the engine, the adjustment must be accomplished by changing the position of the generator and its associated pulley. In prior arangements, this has been accomplished by supporting the generator on a slotted arm and securing it in position with conventional lock-nut means. To change the position of the generator, it was necessary to loosen the lock-nut means and then force or pry the generator to a new position which would take up the slack of the belt, after which the lock-nut was tightened to hold the generator in this new position.

In the vehicles presently being produced, this operation presents considerable difficulty beacuse of the large amount of accessory equipment mounted in the engine space on these vehicles. Consequently, it would be desirable to provide for adjusting the generator position which requires only a simple operation, such as turning a screw member located in a fixed position, rather than a complicated and awkward process such as that described above.

Accordingly, it is an object of this invention to provide an adjusting mechanism which avoids the above disadvantages.

Another object of the invention is to provide a mechanism which will effect the desired adjustment in a single step.

A further object of the invention is to provide an adjusting mechanism which is interchangeable with the original equipment on automotive vehicles, and consequently is easily adapted to any make of vehicle.

According to a preferred embodiment of this invention, these objects are accomplished by providing an adjusting mechanism comprising a support arm having an elongated slot therein. Mounted in this slot is a stud member having a threaded end which is received in the slot and locked in position by conventional lock-nut means. The other end of the stud member has a transverse threaded aperture therethrough which receives one end of an elongated adjusting screw member, the other end of which is rotatably mounted on the support arm.

The generator of the automotive vehicle on which this device is used, is fastened to the threaded end of the stud member, whereupon rotation of the adjusting screw member will cause the stud member, and consequently, the generator to which it is attached to move throughout the length of the elongated slot. In this manner, the generator position can be adjusted conveniently by the simple expedient of turning the rotatably mounted end of the adjusting screw.

This preferred embodiment of the invention is illustrated in the accompanying drawings in which:

Fig. 1 is a front elevation of the adjusting mechanism, showing the attached generator and fan belt pulleys in position;

Fig. 2 is a top plan view of the adjusting mechanism shown in Fig. 1; and

Fig. 3 is a disassembled perspective view of the adjusting mechanism.

Referring now to Figs. 1 and 2 of the drawings, the numeral 1 designates a typical automotive engine block. Located at the lower portion of the engine block 1 is a crank shaft 3 having mounted thereon a crank shaft pulley 5. Near the top of the engine block 1 is a water pump shaft 7 having a water pump shaft pulley 9 mounted thereon.

Secured to engine block 1 by means of a cap screw 11 is the adjusting mechanism of the instant invention, generally designated by the numeral 13. Mounted on the adjusting mechanism 13 is a generator 15 and generator pulley 17. A fan belt 19 passes around the crank shaft pulley 5, the water pump pulley 9, and the generator pulley 17, and is maintained under tension by appropriate adjustment of the adjusting mechanism 13 which moves the generator 15 either to the right or left, as desired, and as shown in Fig. 1.

The detailed structure of the adjusting mechanism 13 is more clearly seen from Fig. 3, which is a dissembled view. The mechanism 13 is here shown as comprising a support arm 21, having an elongated slot 23 therein. One end of the support arm has an offset portion 25 with an aperture 27 located therethrough by means of which the support arm 21 is held in position on the engine block by cap screw 11, as shown in Figs. 1 and 2.

The other end of the support arm 21 has a portion 29 located at right angles to the rest of the support arm and in which there is located a second aperture 31.

Mounted in the elongated slot 23 is a stud member, generally indicated at 33, comprising a threaded portion 35, a flange collar portion 37, and an enlarged head portion 39. A threaded aperture 41 is transversely located in the enlarged head portion 39.

An adjusting screw 43 comprising a threaded portion 45 and an appropriately machined head 47, is rotatably mounted in the aperture 31, which is unthreaded and made slightly larger than the diameter of the threaded portion 45. The adjusting screw 43 is held in place in the offset end 29 of the support arm 21 by a pair of washers 49 and a lock-nut 51, as seen more clearly from Figs. 1 and 2. The threaded end 45 of the adjusting screw 43 is threaded through the aperture 41 in the enlarged head portion 39 of the stud member 33.

The generator 15 is provided with a mounting bracket 16, having an unthreaded hole therethrough of a diameter slightly larger than the stem 35 of the stud 33, through which the stem 35 projects after passing through the elongated slot 23 a sufficient distance to allow such mounting. The generator is then securely locked in place by means of washer 53, lock washer 55, and lock-nut 57.

In operation, when it is desired to adjust the tension of the fan belt 19, the generator mounting is made ready for adjustment by loosening the lock-nut 57 which permits longitudinal motion of the stud 33 in the elongated slot 23. This longitudinal motion is accomplished by turning the head 47 of the adjusting screw 43 until the stud 33, and the generator 15 mounted thereon, is located in the desired position. When such position is attained, the generator is then locked in place by tightening the locknut 57.

To remove the generator 15, it is only necessary to remove the cap screw 11 and then remove the generator with the adjusting mechanism 13 attached thereto. At no time is the adjusting screw 43 depended upon to maintain the correct tension of the fan belt 19, since the locknut 57 securely holds the generator in the adjusted position, but will aid in holding in place, as well as for initially applying tension to the belt.

It can be seen from the above description that there has been provided a simple yet efficient adjusting mechanism which permits the tension regulation of fan belts on automotive vehicles with a minimum of effort on the part of the mechanic or other person performing the adjustment. With the mechanism described, the operation can be performed with a single adjusting wrench, and at no time is more than one hand required to perform the operation. The use of bars to pry the generator into the desired position has been eliminated, and the present device can be used in conjunction with engine accessories which heretofore would have precluded any easy adjustment of the generator position.

While the invention has been illustrated and described in one embodiment, it is recognized that variations and changes may be made therein without departing from the invention as set forth in the claims.

I claim:

1. In an automotive vehicle having an engine block with one or more pulleys journaled for rotary movement thereon, a generator beside the engine block and having a drive pulley, and a drive belt connecting said pulleys together, the combination therewith, of a support arm mounted on the engine block and extending outwardly therefrom, a stud member extending from side to side of said support arm and carried thereby, means on one end portion of the stud member for supporting the generator, and elongated means connected with the stud member at the opposite side of the support arm and extending approximately parallel thereto for adjusting and holding the generator in an adjusted position relative to the support arm.

2. In an automotive vehicle having an engine block with one or more pulleys journaled for rotary movement thereon, a generator beside the engine block and having a drive pulley, and a drive belt connecting said pulleys together, the combination therewith, of a support arm mounted on the engine block and extending outwardly therefrom, a stud member extending from side to side of said support arm and carried thereby, means on one end portion of the stud member for supporting the generator, and an elongated screw member connected with the stud member at the opposite side of the support arm and extending approximately parallel thereto for adjusting and holding the generator in an adjusted position relative to the engine block.

3. In an automotive vehicle having an engine block with one or more pulleys journaled for rotary movement thereon, a generator beside the engine block and having a drive pulley, and a drive belt connecting said pulleys together, the combination therewith, of a support arm mounted on the engine block and extending outwardly therefrom, a stud member extending from side to side of said support arm and carried thereby, means on one end portion of the stud member for supporting the generator, a screw member connected with the stud member at the opposite side of the support arm for holding the generator in an adjusted position relative to the engine block, said support arm having an elongated slot therethrough with the stud member extending through said slot, and threaded means forming said connection at said opposite end of the stud member for effecting lengthwise adjustment of the stud member relative to the arm.

4. A generator mounting for an engine, comprising an elongated arm adapted to be connected at one end with the engine, said arm having a slot extending lengthwise thereof, a stud member extending through the slot, means mounted on one end of the stud member for supporting a generator, and means operatively connected with the stud member at the opposite side of the arm for adjusting said stud member lengthwise of the slot.

References Cited in the file of this patent

UNITED STATES PATENTS

| 936,094 | Davidsen | Oct. 5, 1909 |
| 1,357,741 | Stevens | Nov. 2, 1920 |
| 1,380,113 | Moses | May 31, 1921 |
| 2,010,056 | Brush | Aug. 6, 1935 |
| 2,037,436 | Roddewig et al. | Apr. 14, 1936 |
| 2,433,573 | Montgomery | Dec. 30, 1947 |
| 2,856,786 | Van Duyn | Oct. 21, 1958 |

FOREIGN PATENTS

| 570,909 | Great Britain | July 27, 1945 |
| 637,049 | Great Britain | May 10, 1950 |